Figure 1:
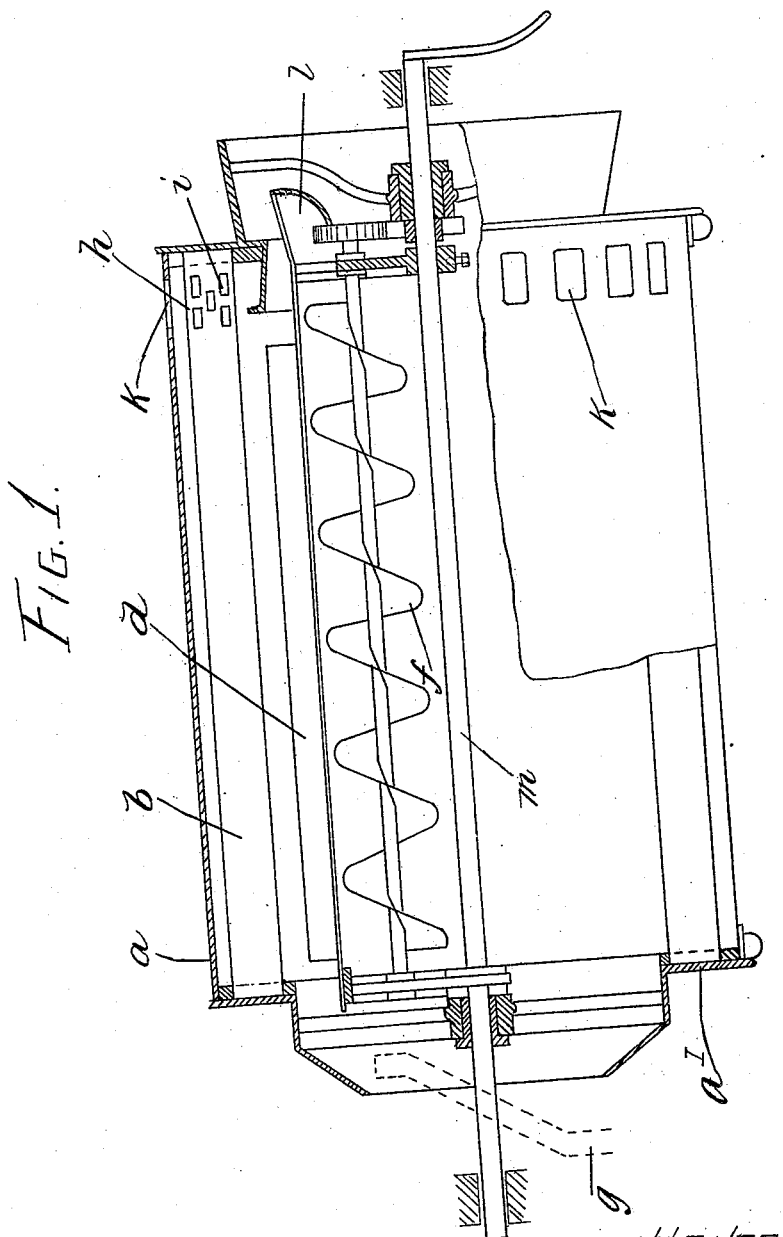

H. MÖBUS.
GRAIN AND SEED SEPARATOR.
APPLICATION FILED MAY 2, 1907.

917,339.

Patented Apr. 6, 1909.
2 SHEETS—SHEET 1.

WITNESSES:

INVENTOR:
HEINR. MÖBUS
by
Attorney.

H. MÖBUS.
GRAIN AND SEED SEPARATOR.
APPLICATION FILED MAY 2, 1907.

917,339.

Patented Apr. 6, 1909.
2 SHEETS—SHEET 2.

WITNESSES:
Jos. Rademacher
Alfr. Pohlmeyer

INVENTOR:
HEINR. MÖBUS.
by
Attorney.

UNITED STATES PATENT OFFICE.

HEINRICH MÖBUS, OF BRAUNSCHWEIG, GERMANY.

GRAIN AND SEED SEPARATOR.

No. 917,339.        Specification of Letters Patent.        Patented April 6, 1909.

Application filed May 2, 1907. Serial No. 371,541.

*To all whom it may concern:*

Be it known that I, HEINRICH MÖBUS, a citizen of the German Empire, residing at Braunschweig, Germany, have invented new and useful Improvements in Grain and Seed Separators, of which the following is a specification.

My invention relates to improvements in grain and seed separators of the class described which comprises a cylindrical drum in which are provided cup-shaped pockets adapted to receive and retain the seeds of weeds and other impurities of smaller size than the grain or seed intended to be cleaned and the objects of my invention are, to provide for an improved arrangement of the said pockets which will cause the seeds of weeds and other small impurities to stay therein for a longer time than could be accomplished heretofore and thus insure their better elimination, and, to increase the efficiency of the machine.

I attain my objects by the construction illustrated on the drawing herewith in which—

Figure 2:
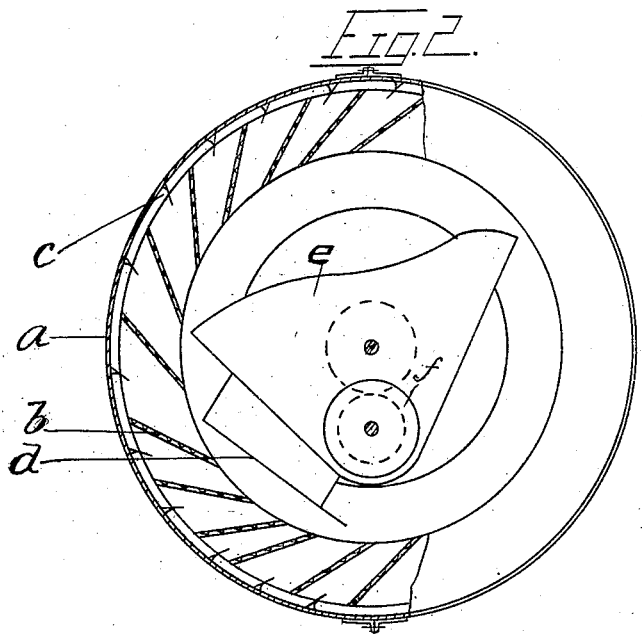

Figure 1 is a longitudinal section through an inclined separator drum as herein described, showing at the same time part of its outside; Fig. 2 is part of a transverse section through the said drum showing the disposition of certain paddles hereinbelow referred to.

To illustrate my invention the drawing shows a cylindrical drum $a$ which may be of plain sheet metal. Inside of the said drum there are arranged about the inner periphery longitudinal paddles $b$ extending from one end of the cylinder to the other, their transverse position being tangentially inclined, and a small space being left between the inner periphery of the cylinder and the outer edges of the tangential paddles to prevent a lodging of grain. While heretofore the pockets above referred to for the seeds of weeds and the like were contained chiefly in the body of the drum I provide them in the paddles referred to, each paddle being pitted with transversely inclined rounded cavities $b'$ large enough to receive during the revolution of the drum the seeds of weeds, which are usually small and globular, but too large for the ordinary grain seeds. The paddles may be made of any permanent material, but the permanency of the working surface and thus the life and therewith the usefulness of the pockets will be considerably increased by a protective surface covering adapted to withstand the wear of the grain and seed, such surface to be placed upon and suitably connected with a base-sheet of softer material.

To the inside of the cylinder there may be attached slender concave blades $c$ laterally projecting into the interspaces of the paddles $b$, the office of the said smaller blades being to better direct the grain or seed upon the larger paddles.

The remainder of the machine may be of any suitable construction, the drawing showing a trough $e$ to receive the impurities or seeds of weeds eliminated from the grain; in the said trough is a conveying screw $f$ and in its lower end a discharge opening $l$. Beneath the said trough there is a chute $d$ which is inclined tangentially and being at the time parallel with the axle of the drum is in a sloping position longitudinally.

The drawing shows further the feeding pipe $g$, in dotted lines, for the grain; $h$ is the discharge end of the drum, the paddles being at this place provided with slots $i$ large enough to permit the passage of the grain, while the cylinder has discharge openings $k$.

The grain or other seed fed into the drum reaches the compartments formed by the interspaces between the paddles $b$ where it is by the rotation of the drum thrown about, some of it dropping upon the chute $d$ from which it is repelled by the force of the rotatory movement and gets in this way between the other compartments. The small and globular seeds of weeds are received in the cavities or pockets referred to where they are through the inclined position of the latter retained until about 45 degrees above the horizontal diameter when they drop into the trough $e$ and are conveyed to the discharge opening $l$ while the grain or larger seed is by the rotatory movement and inclined position of the drum being moved forward toward the discharge-end $h$ of the latter.

I am aware that not all of the features shown in the drawings are new and I therefore do not claim all of the foregoing but—

What I do claim as new and desire to protect by Letters Patent is:

In the rotatory drum of a grain and seed separator the combination of longitudinal paddles arranged about the inner periphery of the drum, their transverse dimension being tangentially inclined, and secured in the ends of the said drum and provided with transversely inclined rounded cavities, a small space being left between the edges of the paddles and the inner periphery of the drum, substantially as described and for the purpose set forth.

In testimony whereof I have signed my name to this specification in the presence of two subscribing witnesses.

HEINRICH MÖBUS.

Witnesses:
JULIUS SECHEL,
ROSA MÖBUS.